(12) United States Patent
Kallakuri

(10) Patent No.: US 11,765,098 B1
(45) Date of Patent: Sep. 19, 2023

(54) CUSTOMIZED CROSS-PREMISE RESOURCE SELECTION FOR CONTAINERIZED APPLICATIONS

(71) Applicant: Amazon Technologies, Inc., Seattle, WA (US)

(72) Inventor: Kumar Deepak Syam Kallakuri, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/701,507

(22) Filed: Mar. 22, 2022

(51) Int. Cl.
  *H04L 67/1012* (2022.01)
  *H04L 67/1008* (2022.01)
  *H04L 47/78* (2022.01)
  *H04L 47/762* (2022.01)

(52) U.S. Cl.
  CPC .......... *H04L 47/762* (2013.01); *H04L 47/781* (2013.01); *H04L 67/1008* (2013.01); *H04L 67/1012* (2013.01)

(58) Field of Classification Search
  None
  See application file for complete search history.

(56) References Cited

U.S. PATENT DOCUMENTS

| | | | |
|---|---|---|---|
| 9,256,467 B1 * | 2/2016 | Singh | G06F 9/5055 |
| 9,276,816 B1 * | 3/2016 | Conte | H04L 41/0895 |
| 10,216,587 B2 | 2/2019 | Hasanov et al. | |
| 10,228,983 B2 * | 3/2019 | Antony | G06F 9/45558 |
| 10,298,670 B2 * | 5/2019 | Ben-Shaul | G06F 3/0635 |
| 10,324,764 B2 * | 6/2019 | Tolmachev | G06F 9/505 |
| 10,503,623 B2 * | 12/2019 | Keller | G06F 9/45558 |
| 10,505,815 B2 * | 12/2019 | Padala | H04L 41/0806 |
| 10,606,881 B2 * | 3/2020 | Chiba | H04L 67/567 |
| 10,693,948 B2 | 6/2020 | Neogi et al. | |
| 10,768,973 B1 * | 9/2020 | Jin | G06F 16/178 |
| 10,915,349 B2 * | 2/2021 | Ranjan | G06F 8/60 |
| 10,977,100 B2 * | 4/2021 | Ambichl | G06F 9/455 |
| 11,188,353 B2 * | 11/2021 | Byard | G06F 21/629 |
| 11,216,309 B2 * | 1/2022 | Piercey | G06F 9/5016 |
| 2020/0034193 A1 * | 1/2020 | Jayaram | G06F 3/0644 |
| 2022/0342649 A1 * | 10/2022 | Cao | G06F 9/5072 |
| 2022/0350675 A1 * | 11/2022 | Navali | G06F 9/45558 |

OTHER PUBLICATIONS

International Search Report and Written Opinion dated May 12, 2023 in PCT/US2023/063776, Amazon Technologies, Inc., pp. 1-12.
Nirmal Singh: "AWS ECS Anywhere: Run Container Workloads in Hybrid Environments", Jun. 4, 2021, Retrieved from the Internet: URL:https://blogs.infosys.com/infosys-cobalt/public-cloud/aws-ecsanywhere-run-container-workloads-in-hybrid-environments.html [retrieved on May 2, 2023], pp. 1-8.

(Continued)

*Primary Examiner* — Backhean Tiv
(74) *Attorney, Agent, or Firm* — Robert C. Kowert; Kowert, Hood, Munyon, Rankin & Goetzel, P.C.

(57) ABSTRACT

A container management service of a provider network causes a container of an application to be run using resources identified for the application at a premise external to the provider network. A condition under which a container of the application is to be run at a resource at a data center of the provider network is determined. In response to detecting that the condition has been satisfied, a container is run at a resource at a data center of the provider network.

20 Claims, 10 Drawing Sheets

(56) References Cited

OTHER PUBLICATIONS

Anonymous: "Amazon Elastic Container Service Developer Guide", Mar. 14, 2022, Retrieved from the Internet: URL: https://web.archive.org/web/20220314065048if /https://docs.aws.amazon.com/AmazonECS/latest/developerguide/ecsdg.pdf [retrieved on May 3, 2023], pp i-388.
Anonymous: "Amazon Elastic Container Service Developer Guide", Mar. 14, 2022, Retrieved from the Internet: URL: https://web.archive.org/web/20220314065048if /https://docs.aws.amazon.com/AmazonECS/latest/developerguide/ecsdg.pdf [retrieved on May 3, 2023], pp. 389-788.
Anonymous: "Amazon ECS User Guide for AWS Fargate", Jul. 28, 2021, Retrieved from the Internet: URL: https://web.archive.org/web/20210728083040if_/https://docs.aws.amazon.com/AmazonECS/latest/userguide/ecs-ug.pdf, [retrieved on May 3, 2023], pp i-392.
Anonymous: "Amazon Elastic Container Service API reference", Jul. 7, 2021, Retrieved from the Internet: URL:https://web.archive.org/web/20210707135738if_/https://docs.aws.amazon .com/AmazonECS/latest/ API Reference/ecsapi.pdf, [retrieved on May 3, 2023], pp i-386.

\* cited by examiner

Client-managed provider network resources 405 (e.g., VCS compute instances/ASGs set up by clients)

CMS-managed non-interruptible provider network resources 410 (e.g., VCS compute instances acquired/released by CMS)

CMS-managed interruptible provider network resources 415 (e.g., VCS "spot" instances that may have to be released based on changes in demand from other VCS clients)

Client-managed client-premise resources 420

VCS-managed client-premise resources 425 (e.g., "outposts")

Client-managed external-provider-network resources 430

CUSTOMIZED CROSS-PREMISE RESOURCE SELECTION FOR CONTAINERIZED APPLICATIONS

BACKGROUND

A software container represents a logical packaging of a software application that abstracts an application from the computing environment in which the application is executed. For example, a containerized version of a software application can include the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. Some modern applications and services are organized as a collection of tasks, with each task run using a set of containers.

BRIEF DESCRIPTION OF DRAWINGS

FIG. 4 illustrates example categories of resources that may be utilized for executing containers by a container management service, according to at least some embodiments.

Figure 1:
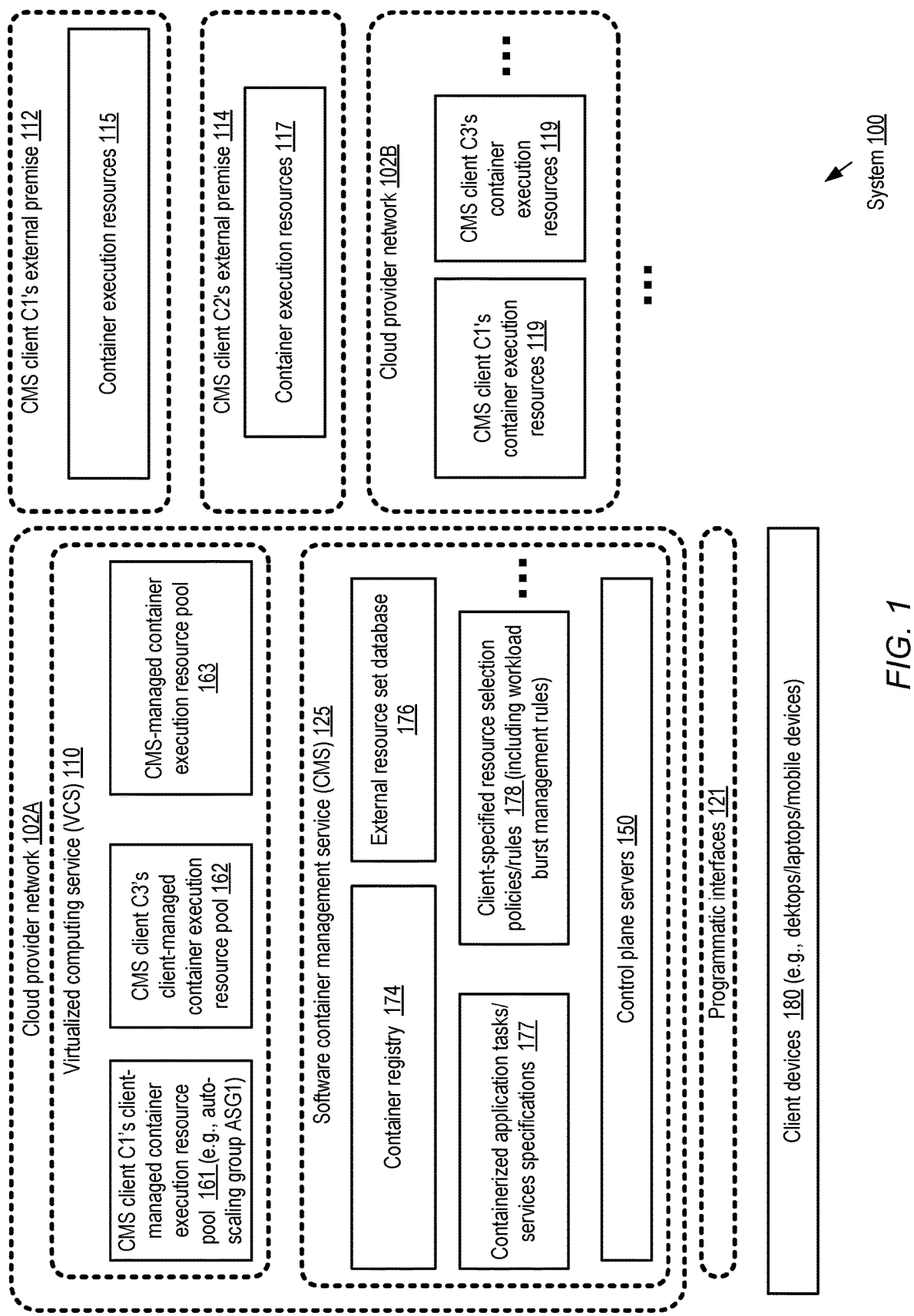
FIG. 1 illustrates an example system environment in which clients of a container management service of a provider network may specify cross-premise resource selection policies for their containerized applications, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for enabling clients of a cloud-based container management service, who may prefer to utilize resources at client-owned premises for a containerized application managed by the service, to specify the conditions (such as periods of high workload levels) under which some of the containers of the application should instead be run at cloud-based computing resources. A client of a container management service (CMS), whose administrative components or control plane is implemented at data centers of a cloud provider network, can register resources (such as a set of physical or virtual machines) at locations external to the cloud provider network as candidates for running tasks of containerized applications of the client. The client can also provide specifications of various containerized applications to be orchestrated by the CMS, such as the machine images of containers to be utilized for tasks of the application, the minimum number of tasks to be run concurrently for a managed service component of the application, and so on. A CMS client can also indicate one or more groups of container execution resources to be used for an application, and the rules to be used for dynamically selecting execution resources for scheduling additional containers either from a pool of registered resources external to the cloud provider network or from a pool of resources available at the data centers of the cloud provider network.

Consider a scenario in which a CMS client has already invested in a substantial set of resources RS1 at a client data center external to the cloud provider network. Such a client can indicate to the CMS that as long as workload levels of a containerized application App1 remain below a specified threshold T, the containers used for App1 tasks should be launched by the CMS using RS1 at the client data center. The client can also indicate that if the workload level exceeds T for at least some period of time, any addition containers for App1 tasks should be launched by the CMS at a specified class of cloud provider network computing resources. A number of different classes of cloud provider network computing resources are available to the CMS, including CMS-managed compute instances of a virtualized computing service (VCS), client-acquired and client-managed compute instances of the VCS, interruptible CMS-managed compute instances of the VCS (computing resources with demand-based dynamically varying costs to the client, which may have to be given up if/when demand increases) and so on. The additional App1 tasks may be launched, for example, in response to specific task requests from the client and/or based on scaling rules specified by the CMS client for the containerized application. The CMS may analyze various metrics (e.g., performance metrics and/or availability metrics) collected from the containerized application to determine if and when the cloud-based resources should be utilized rather than the external-premise resources. By specifying the rules for choosing resources of different types, CMS clients may be able to ensure that their external-premise computing resources are utilized to the extent desired, while also ensuring that cloud-based resources can be applied to their containerized applications as and when needed. A CMS client can also specify rules for moving containerized application workloads back to external resources from cloud based resources, e.g., after a burst of workload that led to the use of the cloud resources has subsided. A CMS may also be referred to as a container orchestration service, aa container service, a cloud container service, a container engine, or a container cloud service.

As one skilled in the art will appreciate in light of this disclosure, certain embodiments may be capable of achieving various advantages, including some or all of the following: (a) providing desired levels of performance (such as application request response times) for containerized applications that are run, by choice, primarily at locations external to the data centers of a cloud provide network, but may sometimes reach workload levels that cannot be handled gracefully at the external locations, and/or (b) ensuring that the utilization levels of various categories of container execution resources selected by clients of container management services are kept within desired ranges.

According to some embodiments, a system may comprise one or more control plane servers (CPSs) of a container management service (CMS) of a cloud provider network, and one or more computing resource pools comprising resources located at one or more data centers of the provider network. The one or more CPSs may be configured to identify an external resource set to be utilized to run at least some tasks of a containerized application on behalf of a CMS client. Resources (such as physical and/or virtual machines) of the external resource set may be located at a premise external to the provider network. Individual ones of the tasks of the containerized application may be run using one or more software containers, with various details regarding the mappings of tasks to containers, the machine images of the containers, etc., being provided via programmatic interfaces by the client to the CMS in at least some embodiments.

A CPS may obtain, via such programmatic interfaces, a burst mode resource selection rule for the containerized application in various embodiments. The resource selection rule may indicate one or more conditions or criteria under which a software container of a task of the application is to be run at a resource at a data center of the provider network, instead of being run using the external resource set. One or more of the CPSs may analyze a metric set of the application, collected at least in part from the external resource set during a time interval in which a container of the application is being run at the external resource set in various embodiments. In response to detecting, based at least in part on analysis of the metric set, that a condition indicated in the resource selection rule has been satisfied, one or more CPSs may cause a particular software container of a particular task of the application to be run at a particular resource of the computing resource pool of the cloud provider network in some embodiments.

In at least some embodiments, the containerized application managed by the CMS on behalf of a CMS client may be configured to respond to application requests from various sources (such as clients of the containerized application, distributed across various networks such as the public Internet or the cloud provider network itself). In one such embodiment, a load balancer may be configured or established, e.g., at the external premise with the help of the CMS control plane servers, for distributing such application requests among the various resources deployed for the containerized application. In scenarios in which a portion of the application is being implemented using resources within the provider network data centers, while the remaining portion is being implemented at the external premise, the CMS control plane servers may at various points in time provide connectivity information to the load balancer regarding the different resources currently being used for the application. This may enable the load balancer to forward application requests to the application's containers/resources deployed within the provider network, as well as the containers/resources at the external premise (or more generally at any of the locations whose resources are being used) in various embodiments.

Any of a number of different categories of cloud-based container execution resources may be utilized for portions of a containerized application by the CMS in different embodiments. In one embodiment, the CMS client may launch a set of compute instances or virtual machines at a virtualized computing service (VCS) in advance, and inform the CMS programmatically, e.g., as part of the resource selection rule, that such pre-launched client-managed compute instances should be used for the application under specified conditions. In another embodiment, the client may indicate to the CMS via a programmatic interface that at least a portion of the containerized application is to be implemented as a managed service by the CMS, without requiring the CMS client to acquire computing resources for that portion of the application. In such a scenario, the CMS may dynamically acquire (or select from a pre-allocated pool) the resources used for some tasks of the application on behalf of the CMS client; in some cases, the CMS client may not necessarily be provided information identifying the acquired resources. In one embodiment, the VCS may support the acquisition of interruptible compute instances (also referred to as "spot" instances) which are acquired from currently-unused VCS data center computing capacity at a low cost, but may have to be given up if the demand from other sources increases, resulting in an increase in the cost. Such interruptible computing resources may be specified as an option for a containerized application by a CMS client in some embodiments, and used by the CMS based on the conditions indicated by the client.

To determine whether a condition indicated in a client-specified resource selection rule has been met, in various embodiments, the CMS (e.g., one or more of the CMS's CPSs) may analyze metrics collected from resources associated with the corresponding containerized application, e.g., including metrics obtained from the external resource set. Such metrics may include performance metrics, such as resource utilization levels (CPU utilization, memory utilization, storage device utilization, network link utilization, network device utilization etc.), latencies for various application requests or lower-level operations performed for the application, application request arrival rates, currently available resource capacity of the external resource set (which may change over time) and the like in different embodiments. In some embodiments, instead of or in addition to performance metrics, availability/failure-related metrics such as counts of application requests that have failed, containers that have exited unexpectedly, and the like may be used for checking the conditions indicated in a resource selection rule. In some embodiments, a CMS may be able to track the available resource capacity available for a client's applications at an external premise because the client may register new servers with the CMS control plane when the new servers are brought online at the external premise for the containerized application, and because agents of the CMS that can track the local resource utilization levels of the servers are installed at each of the servers.

According to some embodiments, the CMS may provide various kinds of information about the mix of resources being used for a containerized application. For example, in response to a programmatic request, an indication of any combination of the following may be provided to a CMS client: (a) one or more software containers of the application run at an external resource set during a particular time interval (b) one or more software containers of the application run using provider network resources at a provider network data center during a particular time interval, and/or (c) details of the specific condition which led to the use of the provider network resources for the application during a particular time interval (e.g., what specific data led to the deployment of the provider network resources, when and from where it was collected, etc.).

In one embodiment, a client may deploy additional container execution resources at the external premise over time, e.g., in response to determining that the existing resource set is insufficient to handle an increasing workload level or for other reasons. In such an embodiment, the CMS may obtain (or be provided) indications of the deployment of such additional external resources, and may select the additional resources for launching containers when new containers have to be launched for the application. In one embodiment, the resource selection rules specified by the client may indicate that an active transition or migration back to the external premise is to be implemented for at least some tasks—e.g., as and when new capacity becomes available at the external premise, one or more of the containers currently being run for the application at provider network resources may be terminated, and replacement containers may be spun up at the newly-provisioned external resources.

In various embodiments, a respective CMS agent (e.g., a software program which establishes a secure network connection to the CMS control plane) may be launched at each external resource at which a CMS-managed container is to be run. The CMS agent may communicate with the CMS control plane servers, receive commands to launch containers, provide health state information pertaining to the containers to the CMS control plane, provide performance metrics and/or available capacity metrics of the external resource, and so on. In at least some embodiments, a respective system management agent may also be run at each such external resource, which can be used if desired by CMS clients to make configuration changes to, or view configuration information of, various containers being run on their behalf at the external resources. In one embodiment, such CMS agents and/or systems management agents may also be run at the provider network resources used to run the client's containerized application.

In at least some embodiments, as indicated above, a CMS and/or a VCS may be implemented as one of a suite of services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, containers of a CMS client's application may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the CMS VCS (which remain at provider network data centers) to the extension location data plane servers in various embodiments.

The cloud provider network may implement various computing resources or services, which may include, in addition to the CMS and the VCS, data processing service(s) (e.g., map reduce, data flow, and/or other large scale data processing techniques), data storage services (e.g., object storage services, block-based storage services, or data warehouse storage services), packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers, edge locations and/or extension locations of the provider network in different embodiments. Network-accessible computing services can include an elastic compute cloud service (referred to in various implementations as an elastic compute service, a virtual machines service, a computing cloud service, a compute engine, or a cloud compute service). Such a service may offer compute instances (also referred to as guest virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which clients of a container management service of a provider network may specify cross-premise resource selection policies for their containerized applications, according to at least some embodiments. As shown, system 100 comprises resources and artifacts of a software container management service (CMS) 125 of a cloud provider network 102A, including a container registry 174, an external resource set database 176, containerized application tasks/services specifications 177, client-specified resource selection policies/rules 178 (including workload burst management rules) as well as control plane servers 150. Cloud provider network 102A may also comprise a number of other services such as a virtualized computing service (VCS) 110, various storage services (not shown), and the like in the depicted embodiment.

The CMS may implement a set of programmatic interfaces 121 in the depicted embodiment, such as one or more web-based consoles, command-line tools, graphical user interfaces, sets of application programming interfaces (APIs) and the like. Such interfaces may be utilized by CMS clients to submit messages and requests from a variety of client devices 180, such as desktops, laptops, mobile computing devices and the like, and receive corresponding responses from the CMS.

The CMS may help its clients with the orchestration and execution of various types of containerized applications in the depicted embodiment. A given containerized application may comprise a collection of one or more tasks, with each task being executed using one or more software containers (for which machine images and other properties may be specified by clients via programmatic interfaces 121, for example). The CMS may reduce the administrative burden placed on containerized application owners by for example, transferring container images to desired execution resources, managing container lifecycle transitions (e.g., launching/terminating containers), managing software updates, monitoring the applications and taking actions based on collected data, etc. Some containerized applications (or portions thereof) may be implemented as managed services by the CMS at the request of CMS clients; for such manages services, the CMS may be responsible, for example, for ensuring that at least a specified number of tasks (or replicas of tasks) are running at resources acquired and managed by the CMS, without requiring the CMS client to acquire or specify the resources to be used for the tasks.

Any of a variety of resource categories may be utilized by a CMS to run containers of CMS client applications in different embodiments. Some of the CMS clients may wish to utilize computing resources at premises external to the provider network's data centers for at least a portion of the clients' containerized applications in the embodiments depicted in FIG. 1; other CMS clients may wish to use only provider network resources.

The CMS clients who prefer to use external resources for at least a subset of their application tasks/containers may use the programmatic interfaces 121 to provide information about the external resources to the CMS control plane in the depicted embodiment. For example, a CMS client C1 may register one or more container execution resources 115 at an external premise 112 (e.g., a data center owned/managed/leased by C1) as an external resource set to be used for one or more of C1's containerized applications. Similarly, another CMS client C2 may register container execution resources 117 as an external resource set via programmatic interfaces 121. Some clients may register external resources at several different locations in the depicted embodiment—e.g., client C1 may also register container execution resources 119 at a different cloud provider network 102B (i.e., a cloud provider network owned and run by a different organization than cloud provider network 102A). Some CMS client's external resources may lie entirely within other cloud provider networks—e.g., CMS client C3's container execution resources 119 may be located within data centers of the cloud provider network 102B instead of being located at a premise owned/managed by C3. The information provided about the external resources (e.g., network addresses, permissions needed to access the resources if required etc.) may be stored in external resource set database 176 of the CMS 125 in the depicted embodiment.

Some CMS clients may also acquire and manage (e.g., using auto-scaling groups or other scalability management constructs supported by the VCS) resources within the VCS 110 for at least a portion of their containerized applications in the depicted embodiment. For example, CMS client C1's client-managed container execution resource pool 161 may comprise a set of VCS compute instances of an auto-scaling group ASG1 in the depicted embodiment. Similarly, CMS client C3 may have set up client-managed container execution resource pool 162. For some containerized applications, CMS clients may indicate to the CMS that provider network-based container execution resources (if and when they are used) are to be managed entirely by the CMS, without requiring the clients to acquire and manage the resources. A CMS-managed container execution resource pool 163 may be utilized by the CMS for this class of applications in the depicted embodiment. In at least some implementations, at least a portion of a CMS-managed container execution pool 163 may be populated with actual resources dynamically, e.g., as and when resources are needed for a given new container, instead of being populated with compute instances or other types of servers in advance. Similarly, the population of client-managed container execution resource pools 161 may also change dynamically in some embodiments, e.g., based on scaling rules selected by the clients and implemented using auto-scaling groups.

CMS clients may utilize the programmatic interfaces 121 to inform the CMS control plane regarding various containers to be used for different applications, such as the identifiers/locations of machine images of the containers, the hardware/software requirements of the containers, and so on. Such information may be stored in a container registry 174 in some embodiments. Clients may utilize programmatic interfaces 121 to provide definitions or specifications 177 of their containerized applications in the depicted embodiment, indicating for example the mix of tasks that make up an application, connectivity requirements among the tasks, whether a portion or all of the application is to be implemented as a managed service by the CMS and if so the task count requirements of the managed service, and/or other properties of the applications. In some embodiments, containerized applications may be specified as logical groupings of tasks and/or services referred to as "clusters", which may be mapped to corresponding groups of containers for implementation.

In the embodiment depicted in FIG. 1, a CMS client may use programmatic interfaces 121 to specify resource selection policies/rules 178 for their containerized applications. Such a rule may indicate, for example, one or more conditions under which resources of a particular category are to be selected for the next task/container to be launched for the application. For example, such a rule may indicate that while under normal operating conditions (as defined using one or more metric thresholds), containers of a given application should be run using an external resource set, under specified circumstances (e.g., when the arrival rates of application requests directed at the containerized application remains above a threshold for a sustained time interval), one or more containers implementing the application should be launched at a provider network resource (such as a resource of a pool 161, 162, or 163) instead.

The control plane servers 150 of the CMS may implement such a resource selection rule as follows in some embodiments: they may analyze metrics indicated in the conditions of the rule on an ongoing basis, and make a decision, using the analyzed metrics, as to which type of resource is to be used for one or more containers of the next task (or the next group of tasks) to be launched for the application. For example, if the default or preferred mode of operation (indicated in a resource selection rule specified by client C1) is to launch containers of an application App1 for client C1 at C1's external premise 112, the control plane servers 150 may begin by launching some number of tasks at container execution resources 115, e.g., for an initial time period of T seconds in the lifetime of the application. As new metrics are collected from container execution resources 115 and analyzed at the CMS control plane, resources may be selected for additional tasks (which may be launched based on scaling requirements of the application) based on results of the analysis, e.g., either from container execution resources 115, from resource pool 161 of the client at cloud provider network 102A, and/or from C1's resources 119 at cloud provider network 102B.

If the rules specified by the client indicate that tasks are to be moved back to a specified external resource set from the cloud provider network resources under a specified condition, such actions may also be initiated by the CMS control plane servers as and when the condition is detected in the depicted embodiment. For example, if a burst of application requests directed to the containerized application of C1 subsides during which resources of pool 161 or pool 163 were used for the application, subsequent tasks (if any) launched for that application may once again utilize the resources at premise 112 in accordance with a rule specified by C1. In one embodiment, a more active approach may be taken to transition application workloads back to a targeted resource set or location—e.g., instead of waiting until a decision about launching a new task or container has to be made, existing containers may be terminated and replacement containers may be launched at the targeted resource set or location. In general, using rules of the kind introduced above, CMS clients may be granted as much flexibility as they desire regarding the selection of resources of different pools/categories/locations to be used for their containerized applications in various embodiments.

In at least some embodiments, in addition to the containers themselves, load balancers may be established by the CMS at the external premises for distributing application requests among the desired set of containers at the external premises. For example, respective load balancers may be set up at premises 112, 114 and/or within cloud provider network 102B. Note that load balancers may also be set up if desired for containerized applications using provider network 102A's resources—e.g., a respective load balancer may be configured for pool 161 or pool 162, or for a set of CMS-managed resources of pool 163 that are deployed for a given client application. If and when cloud provider network resources are deployed for a containerized application whose requests were being distributed using an external-premise load balancer, the CMS control plane may provide information to the external-premise load balancer enabling a subset of the requests to be forwarded to the cloud provider network resources in the depicted embodiment.

A representation of the current mix of resources being used for a given application, and/or metrics collected and analyzed for making resource selection decisions, may be provided via programmatic interfaces 121 to CMS clients upon request in various embodiments. The CMS client may thus be provided explanations, if desired, of decisions to use provider network resources instead of client-premise resources, or more generally the reasons for using any particular category of resource for the client's containerized applications.

Figure 2:
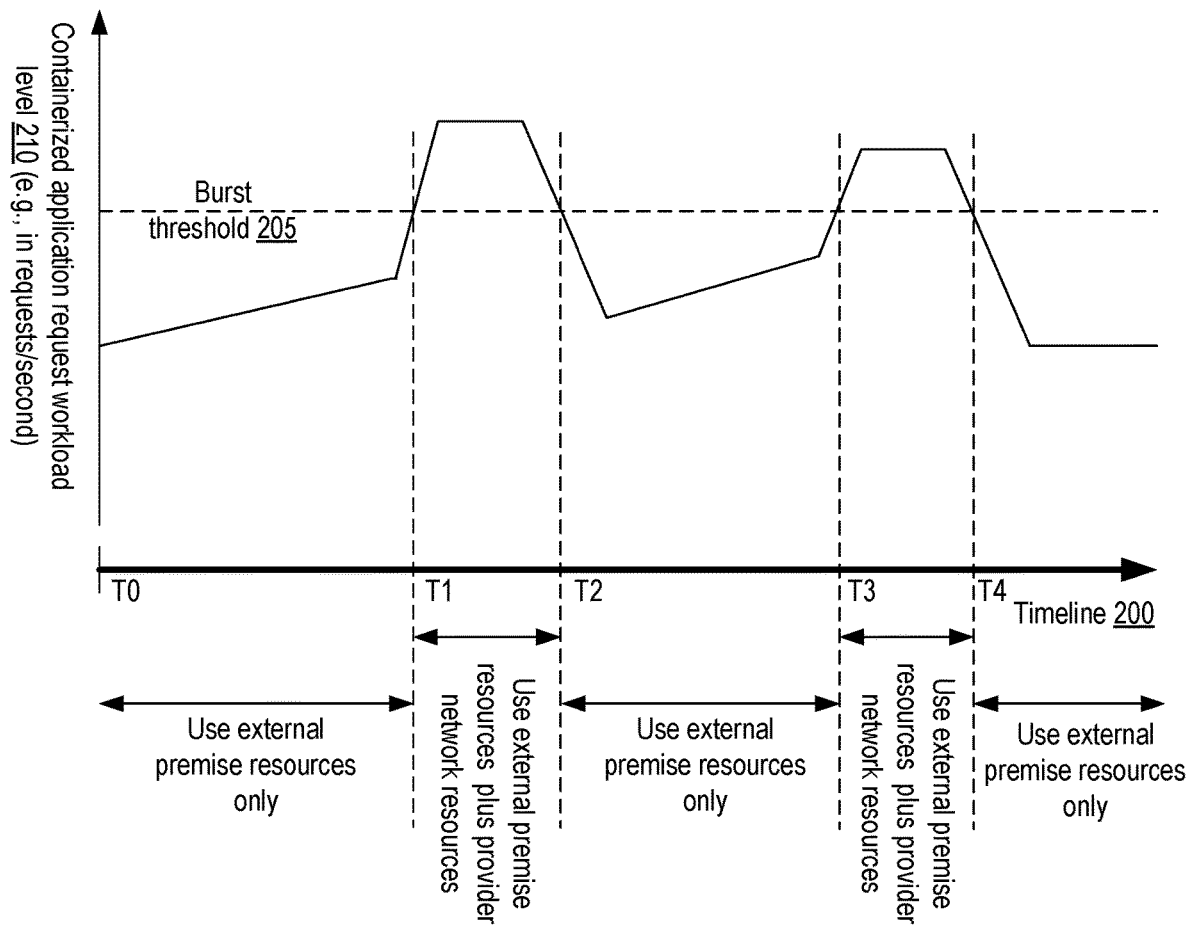
FIG. 2 illustrates an example scenario in which, during periods of increased workload, a containerized application may be run using a combination of resources at a provider network and a premise external to the provider network, according to at least some embodiments.

FIG. 2 illustrates an example scenario in which, during periods of increased workload, a containerized application may be run using a combination of resources at a provider network and a premise external to the provider network, according to at least some embodiments. The workload level 210 of a containerized application implemented with the help of a CMS similar to CMS 125 of FIG. 1 is shown along the Y-axis in FIG. 2, with time shown increasing along timeline 200. The number or amount of external-premise resources available for the application is assumed to be fixed in the embodiment depicted in FIG. 2.

The CMS client on whose behalf the containerized application is being run has specified a burst threshold 205 for the workload, e.g., using a resource selection rule of the kind introduced above. The rule indicates that for time periods in which the workload (measured for example using metrics indicated by the client, such as total application requests per second directed to the containerized application) remains below threshold 205, resources of an external resource set at an external premise are to be used for the application. The rule may further indicate that for time periods in which the workload exceeds the burst threshold, provider network based resources may be used for the application, e.g., in addition to the resources of the external resource set.

In accordance with the rule specified by the client, the following types of resource selection decisions may be made by the CMS in the embodiment depicted in FIG. 2. Between times T0 and T1, resources at the external premise only may be used for the containers of the application. Between T1 and T2, during a time period in which the workload satisfies the burst threshold, at least some additional containers may be launched for the application using provider network resources. At T2, the workload once again falls below the threshold, so any additional containers launched for the application may be launched using the external premise resources only in the depicted example scenario. Between T3 and T4, the burst criterion may again be met, so provider network resources may be employed for additional containers of the application. Beyond T4, external premise resources may once again be used for any additional containers because the workload has fallen below the burst threshold indicated in the rule.

Note that to illustrate the concepts involved and the client's overall intent, FIG. 2 shows a somewhat simplified view of events; in practice, decisions to start using provider network resources may not be instantaneous, it may take some time to verify that the increases beyond the burst threshold are sustained and not transient, and so on. Furthermore, some details regarding the containers that are launched at the provider network resources are left unspecified. For example, are the containers that are launched during the burst intervals T1-T3 and T3-T4 at the provider network allowed to continue running, or are they terminated after the workload falls below the burst threshold, with replacement containers being launched at the external premise. In some embodiments, a resource selection rule may include guidance from the client regarding how such containers are to be handled.

Figure 3:
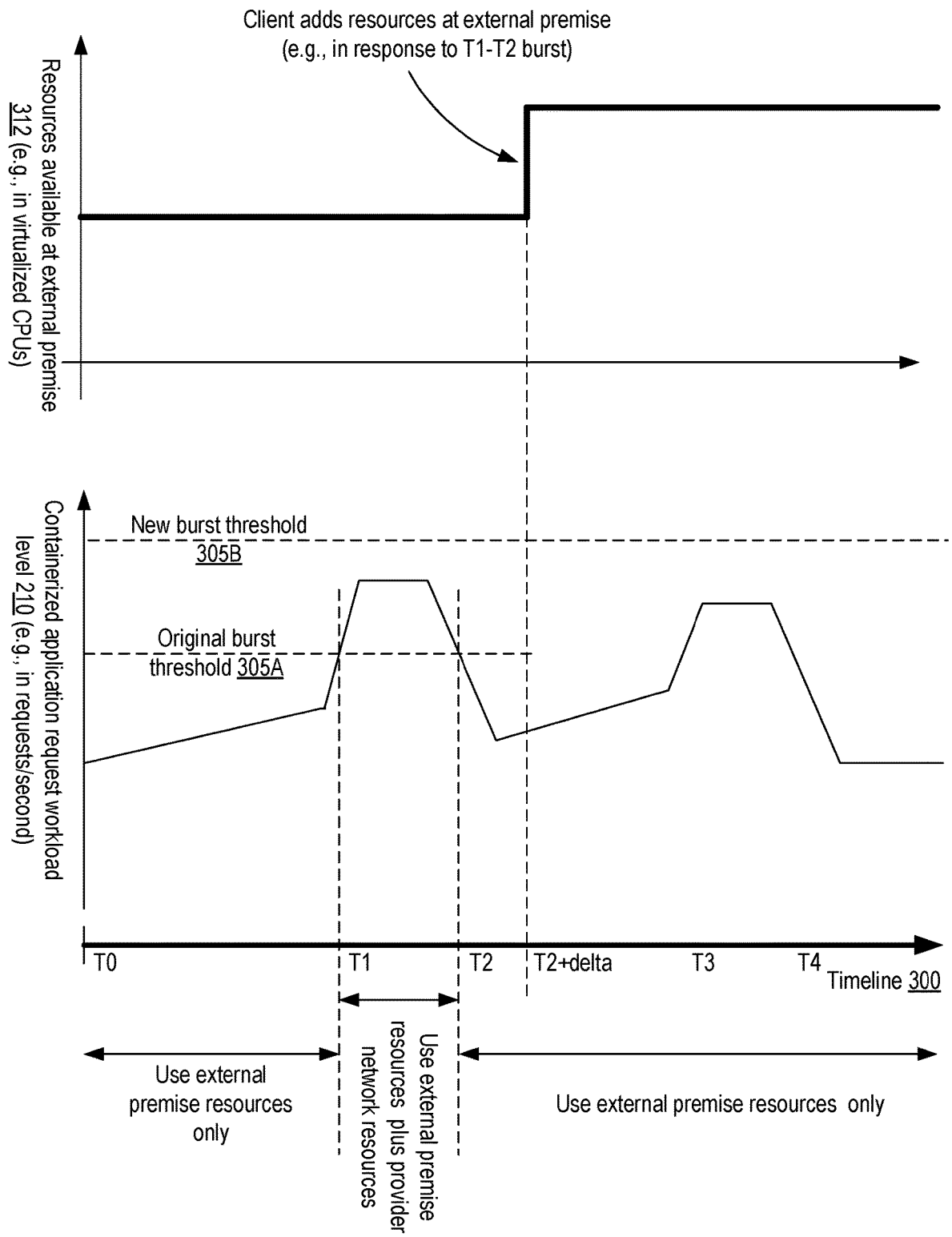
FIG. 3 illustrates an example scenario in which a container management service of a provider network may monitor the availability of resources at a premise external to a provider network to implement a resource selection policy, according to at least some embodiments.

As indicated above, in the scenario discussed with respect to FIG. 2, the total amount of resources available at the external premise is assumed to remain fixed. In practice, a CMS client may sometimes decide to add computing capacity to their external resource set over time, e.g., in response to increasing application workload trends. FIG. 3 illustrates an example scenario in which a container management service of a provider network may monitor the availability of resources at a premise external to a provider network to implement a resource selection policy, according to at least some embodiments. In the lower portion of FIG. 3, a similar workload variation curve to that shown in FIG. 2 is shown with respect to timeline 300, and the client specifies an initial or original burst threshold 305A similar to burst threshold 205 which was indicated in FIG. 2. The assumption that the capacity of the external resource set remains fixed is not valid for the scenario depicted in FIG. 3, however. This time, as indicated in the upper portion of FIG. 3, resources available at external premise 312 are increased: the client adds capacity at time (T2+delta) between T2 and T3, e.g., in response to the burst of workload between T1 and T2. Furthermore, the resource selection rule specified by the client may indicate to the CMS that the amount of available capacity of the external premise should also be considered when making resource selection decisions for the application. The amount of capacity may be tracked, for example, with the help of CMS agents installed at some or all of the servers or virtual machines of the external resource set in some embodiments. Each resource of the external resource set may be required to include such a CMS agent, or a single CMS agent may be provided connectivity to several resources of the external resource set, and each CMS agent may provide information to the CMS control plane regarding the utilization levels of the resources. In one embodiment, instead of or in addition to using CMS agents to obtain available capacity metrics from an external resource set, the CMS control plane may utilize a monitoring service of the provider network; e.g., the CMS client may enable the monitoring service to access to the external resources to be used for CMS-managed containers, and at least some information about the available capacity may be transmitted to the CMS control plane by the monitoring service.

In accordance with the rule specified by the client for the scenario of FIG. 3, the following types of resource selection decisions may be made by the CMS in the embodiment depicted in FIG. 3. Between times T0 and T1, as in FIG. 2, resources at the external premise only may be used for the containers of the application. Between T1 and T2, during a time period in which the workload satisfies the burst threshold 305A and there has been no increase in the available resource capacity at the external premise, at least some additional containers may be launched for the application using provider network resources. At T2, the workload once again falls below the threshold, so any additional containers launched for the application may be launched using the external premise resources only in the depicted example scenario. Now, at T2+delta, more capacity is added at the external premise. The capacity added may be sufficient such that even when the workload rises above the burst threshold 305A at time T3, the CMS can continue to use external premise resources in the depicted embodiment. In the illustrated example in FIG. 3, in accordance with the client-specified policy, provider network resources do not need to be employed for the application beyond T2+delta. The client may specify a new, higher burst threshold 305B after adding capacity to the external premise in the scenario shown in FIG. 3, such that if the workload rises above the new burst threshold, provider network resources may again be used. In some embodiments, instead of the client specifying the thresholds to be used for deciding whether to use provider network resources, the CMS may automatically set the thresholds, e.g., using metrics of available resource capacity obtained from the external premise.

FIG. 4 illustrates example categories of resources that may be utilized for executing containers by a container management service, according to at least some embodiments. One such category may comprise client-managed provider network resources 405, such as VCS compute instances and/or auto-scaling groups set up by the CMS client at one or more data centers of the provider network at which the CMS is implemented. An auto-scaling group may refer to a collection of compute instances that are to managed together for the purposes of scaling one or more applications. A VCS client may specify parameters of such an auto-scaling group, such as the minimum number of compute instances of one or more classes, the maximum number of compute instances, policies to be used to add or remove compute instances from the collection, and so on in various embodiment.

A second category of resources usable for executing containers may include CMS-managed non-interruptible provider network resources 410, such as VCS compute instances and/or auto-scaling groups acquired and released by the CMS control plane. This category of computing capacity may be described as non-interruptible because after a particular resource of the category is assigned for a container of an application, that resource may continue to be used for the container as long as needed by the application, without having to be given up based on increasing demand (e.g., from other applications) for the computing resources. In contrast, CMS-managed interruptible provider network-based resources 415 may include resources (such as "spot" compute instances of a VCS) which may be acquired, often for very low cost, during time periods in which the VCS has a large amount of spare or unused resources, but may have to be given up if demand from other applications increases. Note that in various embodiments, the CMS client on whose behalf resources of categories 410 or 415 are acquired by the CMS may not necessarily be provided details of the resources (such as compute instance identifiers). Instead, a "server-less" experience may be provided to the CMS clients, in which the CMS clients do not have to concern themselves with acquiring or managing the resources at which their containerized application's containers are run.

Client-managed client-premise resources 420 that may be used for containers managed by the CMS may include virtual machines and/or physical servers that are located at premises external to the provider network's data centers in various embodiments. CMS clients may be responsible for acquiring/provisioning and at least partly configuring such resources. Another category of container execution resources utilized by the CMS on behalf of clients may include VCS-managed client-premise resources 425, such as "outpost" compute instances. An outpost comprises a pool of provider network compute and storage capacity (e.g., including a server rack transported to the premise from the provider network) set up at a client premise at the request of a client. Secure connectivity may be established between an outpost administration agent at the external premise and the VCS control plane, and commands to launch compute instances at the external premise, sent by a client to the VCS control plane, may be relayed from the VCS control plane to the outpost administration agent for implementation.

In some embodiments, a CMS client may wish to utilize at least some resources of a different provider network (a provider network run by an organization other than the operator of the provider network at which the CMS is implemented). Such provider networks may be referred to as "external" provider networks. Client-managed external-provider-network resources 430 may represent another class of resources that may be utilized by the CMS to run containerized applications. The CMS client may be responsible for acquiring and configuring the external provider network resources, and providing the CMS control plane various types of information about such resources (e.g., network addresses, computing capacities, credentials needed etc.) which may be required for running software containers on behalf of the client. Rules for selecting resources of any of the categories shown in FIG. 4 when a decision to start a new container is made, and/or rules for "migrating" containers between resources of the different categories, may be specified by CMS clients in various embodiments and implemented by the CMS control plane. Other classes of resources, not shown in FIG. 4, may also or instead be utilized for a CMS client's containerized applications in some embodiments.

Figure 5:
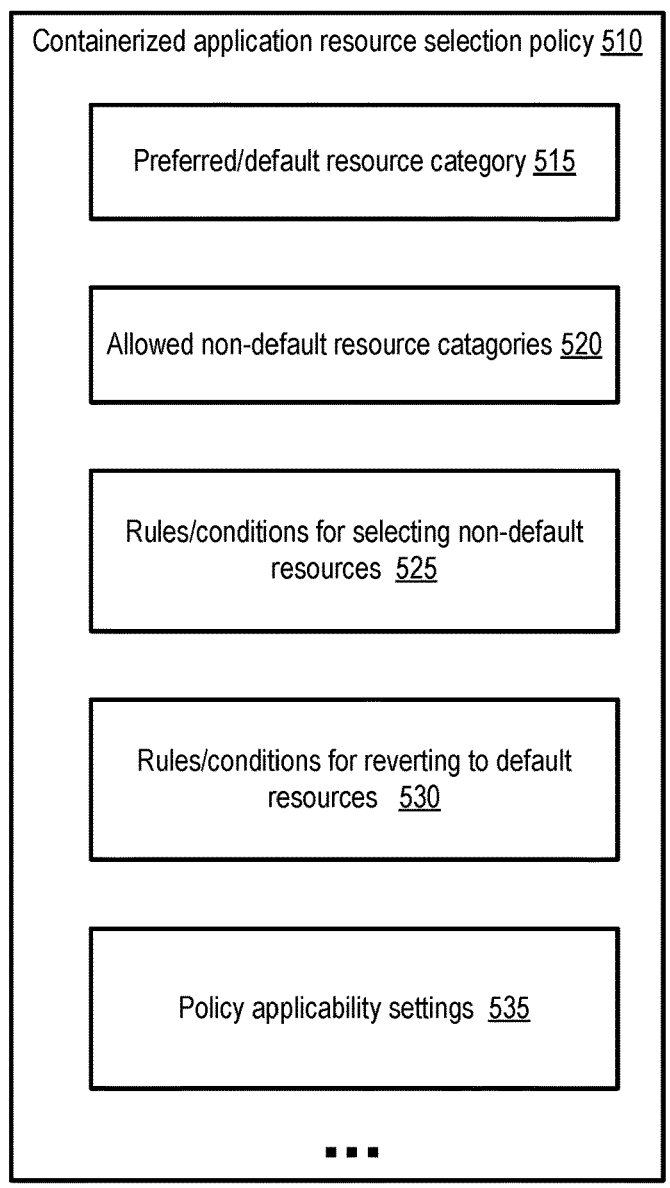
FIG. 5 illustrates example elements of a resource selection policy for containerized applications, according to at least some embodiments.

FIG. 5 illustrates example elements of a resource selection policy for containerized applications, according to at least some embodiments. A representation of a containerized application resource selection policy 510 (for a specified application or for multiple applications) may be transmitted to the CMS control plane by a CMS client via programmatic interfaces in at least some embodiments. In some implementations, such policies may be referred to as capacity provider policies or simply as capacity providers. A given policy may indicate, for example, a preferred or default resource category 515 to be used for the application in the depicted embodiment, such as one of the resource categories indicated in FIG. 4. For example, a CMS client may indicate that client-managed resources at an external premise should be used by default for at least some types of tasks of an application. A set of allowed non-default resource categories 520 may be specified in the policy in at least some embodiments.

Rules/conditions for selecting non-default resources 525 for a given task or container may be included in the policy in the depicted embodiment. Such rules may be based for example on performance or capacity metrics (e.g., metrics of the currently-used resources, and/or metrics of an available pool of resources that has been identified for the application(s)), failure metrics, and/or any other kinds of signals (e.g., changes in dynamic pricing of VCS resources) that the client wishes to utilize. Rules/conditions for reverting to the default resources 530 may be specified in a policy in some embodiments.

In some embodiments in which a given containerized application comprises tasks of several different types (which may be specified in an application definition or cluster definition sent by the CMS client to the CMS control plane), different policies may be used for resource selection for the different task types. Consider a scenario in which an application includes tasks of two different types, type A and type B, differing from one another in properties such as the kinds of computing resources (e.g., CPUs versus GPUs versus special-purpose accelerators) needed, the amount of computing resources needed, the extent to which the tasks need to utilize data stored at a client premise, the sensitivity of the data being processed, and so on. A client may wish to utilize, as a non-default, CMS-managed non-interruptible resources for tasks of type A of the application, and CMS-managed interruptible resources for tasks of type B of the application. A resource selection policy may include policy applicability settings 535 in such an embodiment, specifying the specific task types to which the policy is to apply. In some embodiments, a given resource selection policy may indicate rules/conditions for selecting (and in effect transferring tasks among) resources of any of the categories shown in FIG. 4 for a containerized application.

Figure 6:
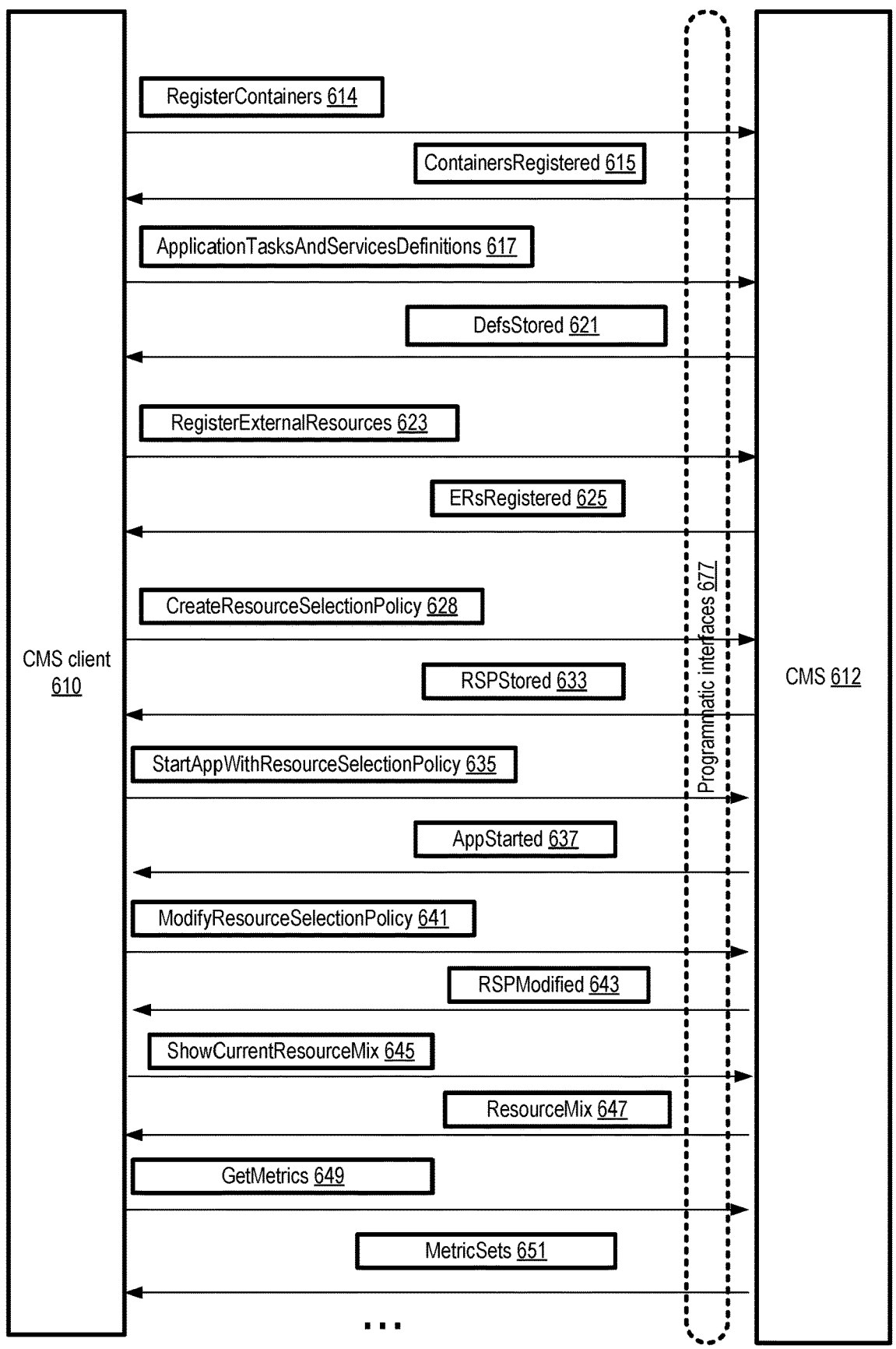
FIG. 6 illustrates example programmatic interactions related to policy-based resource selection for containerized applications, according to at least some embodiments.

FIG. 6 illustrates example programmatic interactions related to policy-based resource selection for containerized applications, according to at least some embodiments. A CMS 612, similar in features and functionality to CMS 125 of FIG. 1, may implement a set of programmatic interfaces 677 in the depicted embodiment. The programmatic interfaces may include, for example, one or more web-based consoles, command-line tools, APIs, and/or graphical user interfaces. The programmatic interfaces can be used by CMS clients 610 (such as owners/administrators of containerized applications) to submit requests and messages pertaining to the use of resource selection policies of the kind introduced above, and receive corresponding responses in various embodiments.

A client 610 may submit one or more RegisterContainers requests 614 via programmatic interfaces 677 in the depicted embodiment, providing information about various kinds of software containers that are to be used for one or more applications. The information may include, for example, identifiers of machine images to be used for the containers, locations (e.g., at storage service of the provider network at which the CMS is implemented) at which the machine images may be found, performance requirements (e.g., the number of virtual or physical CPUs of a specified computing capacity, the amount of memory, etc.) required for the containers, and so on. The information may be stored at a metadata repository such as a container registry of the CMS, and a ContainersRegistered message 615 may be sent to the client in some embodiments.

The CMS client may provide a specification of a containerized application via an ApplicationTasksAndServicesDefinition message 617 in some embodiments. In this message, an indication of the tasks that make up the application, the CMS-managed services that make up the application, the containers that are to be used for each task or service, and other information that is required to execute the containerized application may be provided. The definitions of the tasks/services and the mappings between tasks and containers (or services and containers) may be stored at the CMS, and a DefsStored message 621 may be sent to the client in some embodiments.

Information about a set of resources at an external premise that are to be used for one or more of the client's applications may be provided via a RegisterExternalResources message 623 in at least some embodiments. Such a message may comprise, for example, names and network addresses of physical and/or virtual machines to be used at an external premise for the client's applications, tags indicating sub-classes to which individual resources have been assigned by the client, and so on. The provided information may be stored at the CMS, and an ERsRegistered message 625 may be sent to the client in one embodiment.

The CMS client 610 may use a CreateResourceSelectionPolicy request 628 to submit a representation of a resource selection policy of the kind introduced above in the depicted embodiment. The policy may include various rules that can be used by the CMS control plane to select resources of one or more categories, e.g., in place of resources of a default category, for new or additional containers based on specified conditions. The policy may be stored in a repository of the CMS, and an RSPStored message 633 may be sent to the client in some embodiments. In some embodiments, a resource selection policy may be specified as part of an application definition (e.g., in an ApplicationTasksAndServicesDefinition message 617) instead of in a separate CreateResourceSelectionPolicy request.

A StartAppWithResourceSelectionPolicy request 635 may be submitted by the CMS client in some embodiments, indicating that a specified containerized application should be launched using a specified resource selection policy. Note that in some embodiments, a given resource selection policy may be applied to multiple applications. The application may be started up by the CMS, and an AppStarted message 637 may be sent to the client in the depicted embodiment.

In one embodiment a CMS client may change one or more of the parameters of a resource selection policy, e.g., after the policy has been stored and/or implementation of the policy has begun at the CMS. A ModifyResourceSelectionPolicy request 641 may be sent by the client in such cases, indicating the changes to be made to the policy. For example, the client may add new conditions for choosing non-default resources, remove a condition for reverting back to default resources, and so on. The CMS may make the requested changes and send an RSPModified response message 643 to the client.

A ShowCurrentResourceMix request 645 may be submitted by a client to view the different kinds of (and counts of) resources currently being used for a specified containerized application in some embodiments. An indication of the different kinds of resources currently being used for the application may be provided in a ResourceMix response message 647 by the CMS. A visualization of the resource combination may be presented in some embodiments, e.g., showing how many containers/tasks are being run at the client's premise, how many are being run at the provider network, and so on. In some embodiments reasons for deciding to use particular categories of resources may be provided in response to a ShowCurrentResourceMix request—e.g., the CMS may indicate that K containers were launched at provider network resources at time T as a result of analyzing performance metrics PM from a client premise.

A CMS client may submit a GetMetrics request 649 to view collected metrics of a containerized application being run on behalf of the client by the CMS. In response, the CMS control plane may send one or more MetricsSets messages 651, indicating for example utilization levels for various resources (CPUS, memory, storage etc.) being used by the individual containers running, network bandwidth utilization levels, message latencies, application request response times, counts of failures (e.g., failures of application requests), and so on. It is noted that programmatic interactions pertaining to the use of resource selection policies, other than those interactions shown in FIG. 6, may be supported by a CMS in at least some embodiments.

Figure 7:
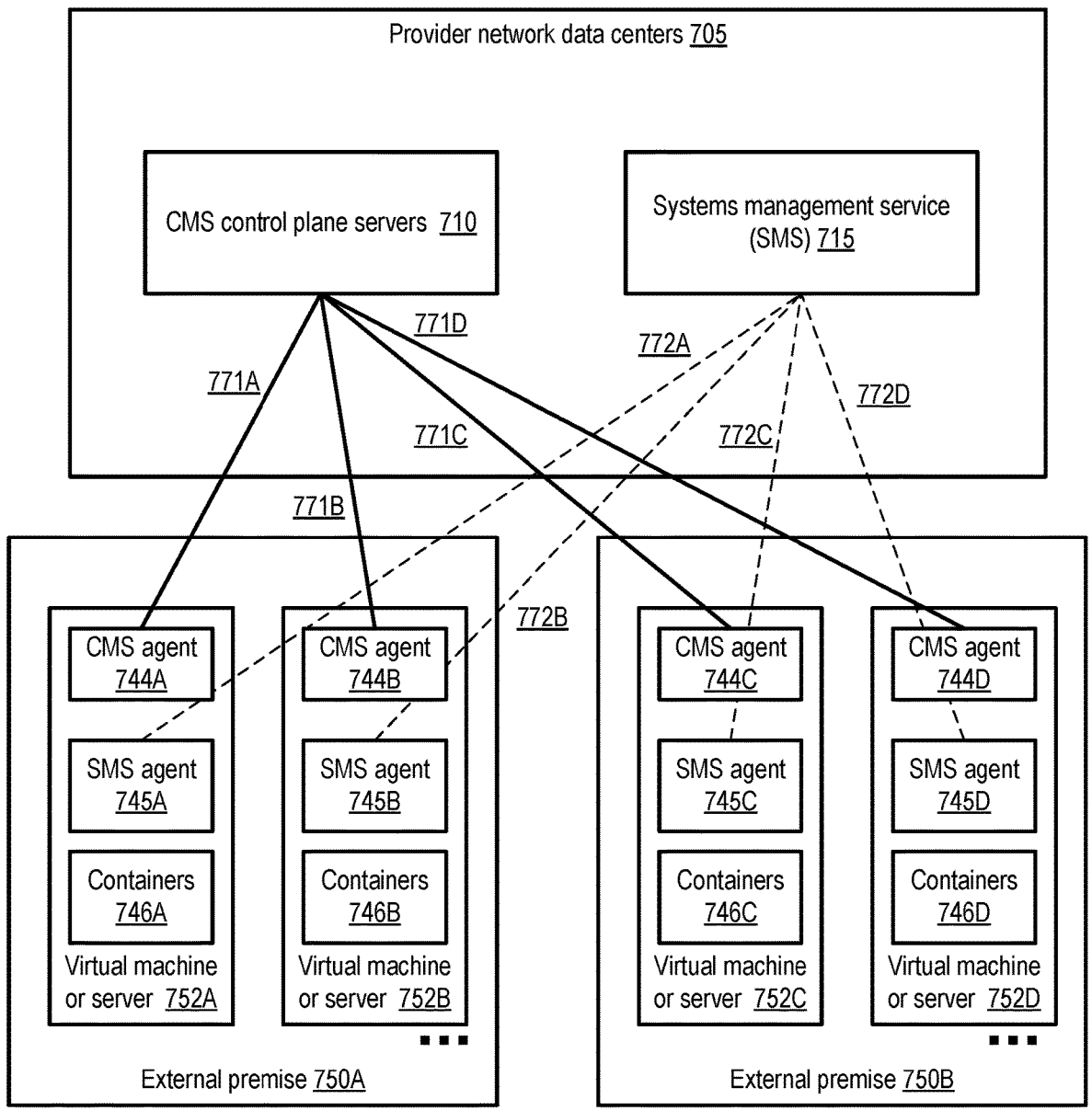
FIG. 7 illustrates an example scenario in which secure communication channels may be established between the control plane of a container management service and agents deployed at container execution resources, according to at least some embodiments.

FIG. 7 illustrates an example scenario in which secure communication channels may be established between the control plane of a container management service and agents deployed at container execution resources, according to at least some embodiments. A respective CMS agent may be run at each of the resources (servers or virtual machines) at which a CMS client wishes to run tasks of containerized applications in the depicted embodiment. For example, at an external premise 750A, CMS agent 744A is run at a virtual machine or server 752A, while CMS agent 744B is run at a virtual machine or server 752B. Similarly, at another external premise 750B, CMS agent 744C is run at a virtual machine or server 752C, and CMS agent 744D is run at a virtual machine or server 752D. Each of the CMS agents may establish secure connectivity (e.g., using a protocol similar to Transport Layer Security or TLS) with CMS control plane servers 710 at provider network data centers 705 in the depicted embodiment as a prerequisite for running containers at the corresponding virtual machines or servers (such as containers 746A, 746B, 746C or 746D). Arrows 771A, 771B, 771C and 771D represent the network connectivity between the CMS agents and the CMS control plane. The CMS agent at a given server or virtual machine may send information to the CMS control plane about currently running containers 746 at that resource, resource utilization levels of the server or virtual machine, failed or unresponsive containers, etc. The CMS agent may stop and start containers 746 at the request of the CMS control plane server. In at least one implementation, a CMS agent may itself be run as a container. Information provided by the CMS agent may be used to select resources for additional containers of a CMS client in accordance with policies/rules specified by the client in at least some embodiments. In one embodiment, a monitoring service of the provider network may be used to collect various metrics and/or log messages from the virtual machines or servers, e.g., in addition to or instead of using CMS agents to collect information, and the data gathered by the monitoring service may also be used to select resources for additional containers of CMS clients' applications.

In some embodiments, as part of preparing an external resource for use by the CMS, a respective agent of a systems management service (SMS) 715 may also be launched at the resource. For example, SMS agents 745A, 745B, 745C and 745D may be launched at virtual machines or servers 752A, 752B, 752C and 752D respectively, and each SMS agent may establish secure connectivity with control plane servers of the SMS at the provider network data centers as indicated by arrows 772A, 772B 772C and 772D. In some implementations an SMS agent may run as a daemon or privileged process. An SMS agent enables the SMS service to update, manage and configure various subcomponents of the virtual machine or server. In some embodiments an SMS agent may enable clients of the CMS to establish communication sessions that can be used to interact with programs running within the containers 746 at a given virtual machine or server. Note that CMS agents and SMS agents may also be run at virtual machines or servers that are utilized for containerized applications within the provider network in at least some embodiments. In some embodiments, a given CMS agent and/or a given SMS agent may be used for managing containers at (and/or providing metrics from) several different virtual machines or servers.

Figure 8:
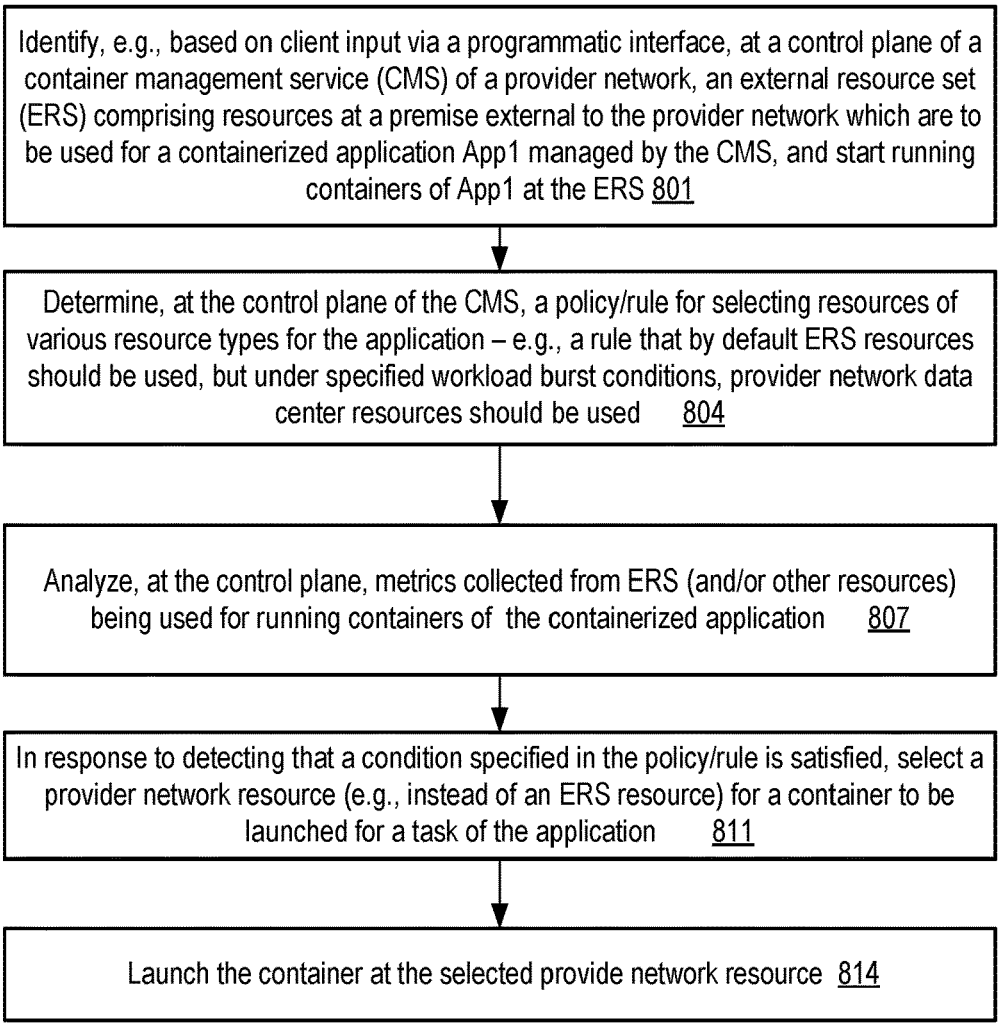
FIG. 8 is a flow diagram illustrating aspects of operations which may be performed to manage cross-premise resource selection for containerized applications, according to at least some embodiments.

FIG. 8 is a flow diagram illustrating aspects of operations which may be performed to manage cross-premise resource selection for containerized applications, according to at least some embodiments. As shown in element 801, an external resource set (ERS) comprising resources at a premise external to a provider network at which a CMS similar to CMS 125 of FIG. 1 is implemented may be identified at a control plane server of the CMS. The ERS may be specified, for example, in a resource registration request submitted via programmatic interfaces by a CMS client, or in response to other programmatic input from the client, indicating computing resources that are to be used for at least a portion of a containerized application App1. The CMS may start running one or more containers for one or more tasks of App1 at the ERS, e.g., in response to specific task requests from the CMS client and/or in accordance with a managed service specification of App1.

A policy or rule indicating conditions for selecting resources of various resource types (such as the resource categories shown in FIG. 4) for running containers of the application may be determined at the control plane of the CMS in the depicted embodiment (element 804). The rule or policy may also be obtained via a programmatic interface from a CMS client in some embodiments. Such a resource selection rule my, for example, indicate that by default, ERS resources should be used for the application, but that under specified workload burst conditions, resources of the provider network (e.g., resources at provider network data centers) may be used instead of or in addition to ERS resources.

A set of metrics of the application, including performance metrics, availability/failure metrics and/or indications of computing capacity changes at the external premise, may be analyzed at the CMS control plane in the depicted embodiment (element 807). The metrics may be obtained via any of a variety of sources, such as CMS agents installed at resources at the external premise and/or at provider network resources, a monitoring service of the provider network which has been permitted to capture metrics from ERS resources, and so on.

In response to detecting, e.g., using the analyzed metrics, that a condition indicated in the rule or policy has been satisfied, the CMS control plane may select a provider network resource (instead of an ERS resource) for launching a container for a task or service of the application in various embodiments (element 811). Any of a variety of triggering events may lead to the determination that a new (or replacement) container is to be launched in the depicted embodiment—e.g., a CMS client may submit a request to run an additional task of the application, a service definition of the application may require additional tasks to be launched based on arrival rates of application requests, a failure of an earlier-launched container may require a replacement container, and so on. Note that the determination that a new container is to be launched may be orthogonal to the decision as to which type of resource is to be used to run the new container in at least some embodiments.

After the resource type has been selected based on the rule/policy, a particular resource of that type may be identified (e.g., from a dynamically allocated pool of such resources, or a pre-allocated pool of such resources), and the container may be launched at that resource in various embodiments (element 814). It is noted that in various embodiments, some of the operations shown in FIG. 8 may be implemented in a different order than that shown in the figure, or may be performed in parallel rather than sequentially. Additionally, some of the operations shown in FIG. 8 may not be required in one or more implementations.

Figure 9:
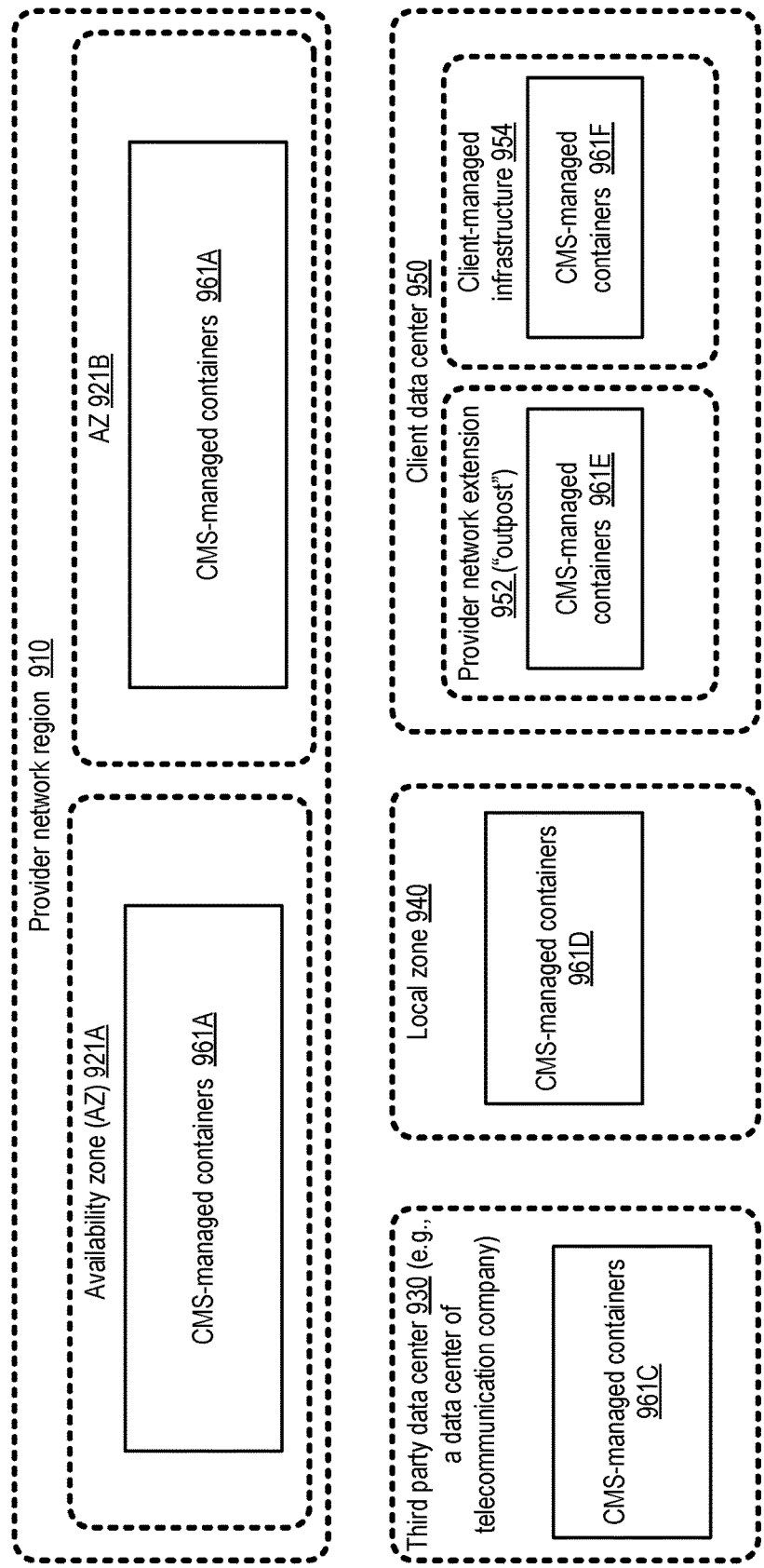
FIG. 9 illustrates an example scenario in containerized application components may be executed at a variety of availability zones and other infrastructure units, according to at least some embodiments.

FIG. 9 illustrates an example scenario in containerized application components may be executed at a variety of availability zones and other infrastructure units, according to at least some embodiments. In the embodiment shown in FIG. 9, a particular region 910 of a cloud provider network may comprise a pair of availability zones, AZ 921A and AZ 921B. Some software containers 961A of containerized applications managed with the help of a CMS may be run within AZ 921A, while others may be run within AZ 921B. For some containerized applications such as cellular communication applications (including, for example, public or private 5G network applications), CMS-managed containers 961C may be run at a third party data center 930, such as a data center maintained by a telecommunication company. Other CMS-managed containers 961D may be run at a local zone 940. At a CMS client's data center 950, CMS-managed containers 961E may be run at a provider network extension 952 (an outpost), and/or CMS-managed containers 961F may be run using client-managed infrastructure 954. A given containerized application may use resources at any combination of one or more of the different kinds of infrastructure units shown in FIG. 9 in various embodiments. Resource selection rules specified by the client on whose behalf the containerized application is being run may be used by the CMS to dynamically select the particular premise and resource type to be used for containers of the application in the depicted embodiment.

Figure 10:
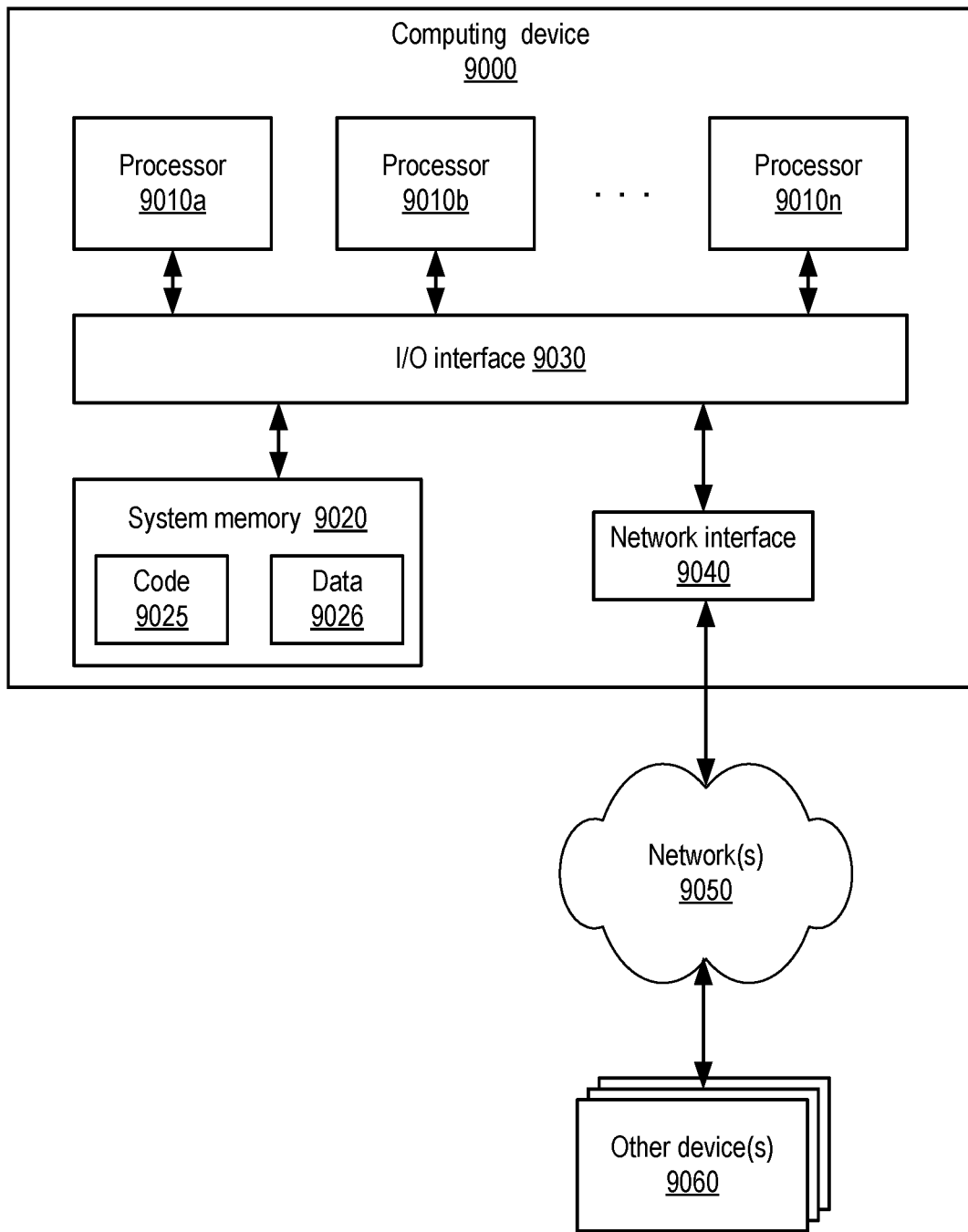
FIG. 10 is a block diagram illustrating an example computing device that may be used in at least some embodiments.

In at least some embodiments, a server that implements the types of techniques described herein (e.g., including CMS control plane functions and other container management, analysis and monitoring tasks), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a control plane server of a container management service of a provider network; and
a computing resource pool of a data center of the provider network;
wherein the control plane server is configured to:
identify an external resource set to be utilized to run at least some tasks of a containerized application, wherein resources of the external resource set are located at a premise external to the provider network, and wherein individual ones of the tasks are executed using one or more software containers;
obtain, via a programmatic interface, a burst mode resource selection rule for the containerized application, wherein the burst mode resource selection rule indicates a condition under which a software container of a task of the containerized application is to be run at a resource at a data center of the provider network instead of being run using the external resource set;
analyze a metric set, wherein the metric set is collected at least in part from the external resource set during a time interval in which a software container of a task of the containerized application runs at the external resource set; and
in response to detecting, based at least in part on analysis of the metric set, that the condition has been satisfied, cause a particular software container of a particular task of the containerized application to be run at a particular resource of the computing resource pool.

2. The system as recited in claim 1, wherein the control plane server is further configured to:
obtain an indication that the containerized application is to be implemented at least in part as a managed service without requiring a client on whose behalf the containerized application is run to acquire container execution resources at the provider network, wherein the particular resource is acquired by the container management service for executing the particular software container.

3. The system as recited in claim 1, wherein the metric set indicates one or more of: (a) a resource utilization level, (b) a latency, (c) an application request arrival rate or (d) an available resource capacity of the external resource set.

4. The system as recited in claim 1, wherein the control plane server is further configured to:
provide, in response to a programmatic request, an indication of one or more of: (a) one or more software containers of the containerized application which are run at the external resource set during a particular time interval (b) one or more software containers of the containerized application which are run at the data center of the provider network during a particular time interval, or (c) a metric which led to the use of provider network resources for the containerized application during a particular time interval.

5. The system as recited in claim 1, wherein the control plane server is further configured to:
provide, to a load balancer associated with the application, connectivity information enabling the load balancer to forward an application request to the particular resource, wherein the load balancer runs at the premise external to the provider network.

6. A computer-implemented method, comprising:
identifying, at a container management service of a provider network, an external resource set to be utilized to run at least some software containers of an application, wherein resources of the external resource set are located at a premise external to the provider network;
causing, by the container management service, a software container of the application to be run at a resource of the external resource set;
determining, by the container management service, a condition under which a software container of the application is to be run at a resource at a data center of the provider network; and
in response to detecting that the condition has been satisfied, causing, by the container management service, a particular software container of a particular task of the application to be run at a particular resource at a data center of the provider network.

7. The computer-implemented method as recited in claim 6, wherein the application is executed on behalf of a client of the provider network, and wherein the particular resource comprises a compute instance launched at the request of the client at a virtualized computing service of the provider network.

8. The computer-implemented method as recited in claim 6, further comprising:
obtaining, at the container management service from a client, an indication that the application is to be implemented at least in part as a managed service without requiring the client to acquire container execution resources at the provider network, wherein the particular resource is selected by the container management service for executing the particular software container.

9. The computer-implemented method as recited in claim 6, further comprising:
obtaining, at the container management service, a set of performance metrics of the application, including at least one performance metric collected at the external resource set, wherein detecting that the condition has been satisfied is based at least in part on the set of performance metrics.

10. The computer-implemented method as recited in claim 9, wherein the performance metric collected at the external resource set indicates one or more of: (a) a resource utilization level, (b) a latency, (c) an application request arrival rate or (d) an available resource capacity of the external resource set.

11. The computer-implemented method as recited in claim 6, further comprising:
obtaining, at the container management service, a set of availability metrics of the application, including at least one availability metric collected at the external resource set, wherein detecting that the condition has been satisfied is based at least in part on the set of availability metrics.

12. The computer-implemented method as recited in claim 6, further comprising:
providing, by the container management service in response to a programmatic request, an indication of one or more of: (a) one or more software containers of the application run at the external resource set during a particular time interval (b) one or more software containers of the application run at the data center of the provider network during the particular time interval, or (c) a condition which led to the use of provider network resources for the application during the particular time interval.

13. The computer-implemented method as recited in claim 6, further comprising:
obtaining, at the container management service after the particular software container has been launched at the particular resource at the data center of the provider network, an indication of one or more resources that have been added to the external resource set at the premise external to the provider network; and
selecting, by the container management service to run another software container of the application, a resource of the one or more resources that have been added to the external resource set.

14. The computer-implemented method as recited in claim 6, wherein identifying the external resource set is based at least in part on input received via a programmatic interface of the container management service.

15. The computer-implemented method as recited in claim 6, wherein determining the condition is based at least in part on input received via a programmatic interface of the container management service.

16. A non-transitory computer-accessible storage medium storing program instructions that when executed on a processor:
cause, by a container management service of a provider network, at least some software containers of an application to be run at an external resource set identified for the application, wherein resources of the external resource set are located at a premise external to the provider network;
determine, by the container management service, a condition under which a software container of the application is to be run at a resource at a data center of the provider network; and
in response to detecting that the condition has been satisfied, cause, by the container management service, a particular software container of a particular task of the application to be run at a particular resource at a data center of the provider network.

17. The non-transitory computer-accessible storage medium as recited in claim 16, wherein the application is executed on behalf of a client of the provider network, and wherein the particular resource comprises a compute instance launched at the request of the client at a virtualized computing service of the provider network.

18. The non-transitory computer-accessible storage medium as recited in claim 16, storing further program instructions that when executed on the processor:

obtain, at the container management service from a client, an indication that the application is to be implemented at least in part as a managed service without requiring the client to acquire container execution resources at the provider network, wherein the particular resource is selected by the container management service for executing the particular software container.

19. The non-transitory computer-accessible storage medium as recited in claim 16, storing further program instructions that when executed on the processor:

obtain, at the container management service, a set of performance metrics of the application, including at least one performance metric collected at the external resource set, wherein detecting that the condition has been satisfied is based at least in part on the set of performance metrics.

20. The non-transitory computer-accessible storage medium as recited in claim 16, storing further program instructions that when executed on the processor:

cause to be provided, by the container management service in response to a programmatic request, an indication of one or more of: (a) one or more software containers of the application run at the external resource set during a particular time interval (b) one or more software containers of the application run at the data center of the provider network during a particular time interval, or (c) a metric which led to the use of provider network resources for the application during the particular time interval.

* * * * *